US006337743B1

(12) United States Patent
Brown et al.

(10) Patent No.: US 6,337,743 B1
(45) Date of Patent: Jan. 8, 2002

(54) METHOD AND SYSTEM OF PRINT STREAM ADDRESS EXTRACTION

(75) Inventors: Nanette Brown, Norwalk; Victor Girardi, Oxford, both of CT (US); Michael S. Kelley, Woodinville, WA (US); Paul A. Kovlakas, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/119,183

(22) Filed: Jul. 20, 1998

(51) Int. Cl.[7] .......... G06F 15/00

(52) U.S. Cl. .......... 358/1.13; 358/1.15

(58) Field of Search .......... 358/1.13, 1.14, 358/1.15, 1.16

(56) References Cited

U.S. PATENT DOCUMENTS

| | | | | |
|---|---|---|---|---|
| 4,858,907 A | | 8/1989 | Eisner et al. | 271/124 |
| 5,146,439 A | * | 9/1992 | Jachmann et al. | 369/25 |
| 5,175,691 A | | 12/1992 | Baker | 364/478 |
| 5,278,947 A | | 1/1994 | Balga et al. | 395/117 |
| 5,319,562 A | | 6/1994 | Whitehouse | 364/464.01 |
| 5,326,181 A | | 7/1994 | Eisner et al. | 400/104 |
| 5,400,243 A | | 3/1995 | Oheda et al. | 364/419.17 |
| 5,495,581 A | | 2/1996 | Tsai | 395/154 |
| 5,546,577 A | | 8/1996 | Marlin et al. | 395/600 |
| 5,583,970 A | | 12/1996 | Strobel | 395/114 |
| 5,657,431 A | | 8/1997 | Plakosh et al. | 395/115 |
| 5,668,934 A | | 9/1997 | Maw | 395/110 |
| 5,668,990 A | | 9/1997 | Bajorinas et al. | 395/615 |
| 5,680,615 A | | 10/1997 | Marlin et al. | 395/614 |
| 5,684,934 A | | 11/1997 | Chen et al. | 395/113 |
| 5,869,824 A | * | 2/1999 | Okada et al. | 235/380 |

* cited by examiner

*Primary Examiner*—Joseph Mancuso
*Assistant Examiner*—Douglas Tran
(74) *Attorney, Agent, or Firm*—Ronald Reichman; Paul A. Levitsky; Michael E. Melton

(57) ABSTRACT

The invention is a method and system for determining an address from a print stream. Address determination begins by initiating the print stream at a remote application. The print stream is transmitted through a graphical driver interface to a virtual driver where a system operator can select a data interface mode such as an eavesdrop mode and an intercept mode. The eavesdrop mode allows the virtual driver to pass the print stream through to the output device while producing a duplicate copy of the print stream for transmission to a server which is linked to an address parsing module for parsing the print stream. The intercept mode allows the virtual driver to pass the print stream directly to the server for parsing the print stream. The server will in turn pass the print stream to an output device such as a printer or monitor over transmission means. Parsing of the print stream to obtain address data is performed in accordance with instructions resident in the module. The address data is then placed into an address list or database. The selection of the address parsing module is further based upon the address characteristics required by the system user. The characteristics are defined by creating an address data profile comprised of tokens and wherein the tokens further define a characteristic of an address. The address parsing module can then be selected as based upon its particular address format which can be representative of a particular carrier.

15 Claims, 9 Drawing Sheets

( PROIR ART )

METHOD AND SYSTEM OF PRINT STREAM ADDRESS EXTRACTION

RELATED APPLICATIONS

Reference is made to application Ser. No. 09/119,463 entitled A METHOD AND SYSTEM OF DISPLAYING DATABASE CONTENTS IN ENVELOPE DATA FIELDS, assigned to the assignee of this application and filed on even date herewith.

Reference is made to U.S. Pat. No. 6,282,524 issued on Aug. 28, 2001, entitled A METHOD AND SYSTEM OF PRINTING POSTAGE INDICIA FROM AN ENVELOPE DESIGN APPLICATION, assigned to the assignee of this application and filed on even date herewith.

Reference is made to application Ser. No. 09/119,462 entitled A METHOD AND SYSTEM FOR CAPTURING DESTINATION ADDRESSES FROM LABEL DATA, assigned to the assignee of this application and filed on even date herewith.

BACKGROUND OF THE INVENTION

Addressing systems are an example of systems whose purpose is to utilize address lists, perform addressing hygiene through the use of address correction techniques, assign barcoding and, download data to addressing printers, collators, sealers, and the like, for the purpose of producing a mailpiece.

The print stream introduced to addressing systems is generally in the form an address list, though it may take on other forms. The list must be parsed and checked before format correction and barcoding techniques can be directed to the addresses on the list before creation of a mailpiece.

An address database provides a link to prospective customers by creating the ability for a list user to reach out to those customers represented by the database's individual addresses. The value of the database is measured in terms of the discounts available for the sending of mailpieces, the scope of the target audience, the detail, and accuracy of an individual address. The value is thus derived from the detail found in its contents.

There is thus great value in assembling files for a database where the files are "complete" in detail. The ability to ensure detail of files withinan address database has been taught in such prior art as U.S. Pat. No. 5,668,990 for an APPARATUS AND METHOD FOR GENERATING 100% UNITED STATES POSTAL SERVICE BAR CODED LISTS issued Sep. 16, 1997 to Bajorinas et al. (hereinafter referred to as Bajorinas) and assigned to the assignee of the present claimed invention.

Bajorinas disclosed a method and apparatus for generating a coded address list. The method is initiated by inputting an address list to a data processing device which then reads each address record on the address list. As an address record is read, a set of rules is applied to the record to determine whether or not a corresponding bar code can be assigned. If a bar code can be assigned, then the data processing device writes the address record and its corresponding bar code to a first list. If, however, a corresponding bar code is not determined for an address record, then the unmatched address record is posted to a second list. The first list is output for printing, while the second list is saved to memory. With respect to the second list, the system operator can: manually correct an address record on the list; delete the address record; or, output the address record to a printer for non-discounted mailing.

Refinement to file contents within an address database can be further made by employing methods disclosed in such prior art as U.S. Pat. application Ser. No. 08/413,579 for a METHOD AND SYSTEM FOR MINIMIZING ATTRIBUTE NAMING ERRORS IN SET ORIENTED DUPLICATE DETECTION with a Notice of Allowance issued therefore on Feb. 6, 1998 for Robert J. Johnson et al. (hereinafter referred to as Johnson) and assigned to the assignee of the present claimed invention.

Johnson disclosed a method and system for detecting duplicate records on a list or in a file. The method steps include entering a list, comprised of one or more records, to a data processing system; then, applying a nickname lookup table to the records to determine a common first name. Once a common name has been determined, the method matches a first record from the list with a second record from the list by comparing the fields of the first record with the fields of at least one other record; the comparison is based on a set of pre-determined criteria. The matching sequence determines a duplicate set, wherein the duplicate set is comprised of at least two records with fields that match. The method then lists matching records sequentially so that the system can create a new record by filling each empty field with a next available corresponding field from a subsequent record within the duplicate set. The newly created record is then retained on the original list; and the duplicate records are placed on a second list. Pre-sorting of the list can occur just prior to the matching sequence as well as just prior to outputting the final list. Additionally, the system operator can be given a number of options to provide flexibility. These options can include: manually correcting a record on the duplicate records list; deleting an address record from the list of duplicates; or, outputting the record.

The value of the perfected files in the address database become readily apparent when the lists are printed to media when forming individual mailpieces to which postage is to be applied. The postal discounts available to the postal service customer are calculated by mailpiece production systems and are therefore only as good as the value of the data input to the system.

Mailpiece production systems are known in the art and have developed with changes in postal service regulations (such as those of the United States Postal Service, or USPS) and with the proliferation of appropriate software applications. In turn, this production has served the need to automate and accelerate to accommodate growth.

As the USPS, together with the postal services of other countries around the world, moves toward more fully automated mail handling in an effort to contain costs while processing ever increasing volumes of mail, automated equipment which sorts and processes mail on the basis of machine readable postal codes, such as the "zip code" or other forms of postal coding, play an ever more significant role. In the United States, postal service regulations provide for a "Postnet" bar code which represents the five, nine, or eleven digit zip code of the destination address in a machine readable form. 4-State can be utilized within Canada.

Systems have been used or proposed to meet the need to produce mail pieces imprinted with the Postnet bar code, and to enable mailers to obtain the benefit of the discounts offered for such mail. One such system is described in U.S. Pat. No. 4,858,907, for a SYSTEM FOR FEEDING ENVELOPES FOR SIMULTANEOUS PRINTING OF ADDRESSES AND BAR CODES, issued to Eisner et al. (hereinafter referred to as Eisner-1) on Aug. 22, 1989. This patent discloses a system for printing envelopes with addresses, zip codes, and corresponding bar codes. The system is controlled by a computer which includes software for converting a zip code included in the address into bar code form and then adding the bar code representation to the material to be printed on the envelope.

Another example of the art is found in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. (hereinafter referred to as Eisner-2). This patent teaches a method of addressing substrates with a human readable address containing a zip code and a bar code corresponding to the zip code. The method utilizes a computer and comprises several steps. These steps include: receiving in the computer a plurality of addresses, with pre-existing zip code information contained in each as complete address data, and requiring no manual inputting or identification; automatically scanning the address data in the computer to find the pre-existing zip code; automatically converting, in the computer, the pre-existing zip code into a line of corresponding bar code; and, essentially simultaneously printing the complete address, including zip code information and corresponding bar code, on a substrate, under control of the computer so that the substrate produced has human readable zip code and machine readable bar code information thereon.

Additionally, a system for printing envelopes with addresses including bar code is disclosed in commonly assigned U.S. Pat. No. 5,175,691 for a SYSTEM AND METHOD FOR CONTROLLING AN APPARATUS TO PRODUCE ITEMS IN SELECTED CONFIGURATIONS; issued on Dec. 29, 1992 to Baker et al. (hereinafter referred to as Baker), which describes a system for printing mail pieces which includes a printer for printing sheets and envelope forms and a folder-sealer mechanism for folding the envelope form around the sheets to form a mail piece, and a computer based control system for controlling the printer and folder. In the system of this application, when an operator is creating a file of letters to be printed, the operator may designate a selected field within each letter as containing the destination address. The system will then extract the information in this designated field and with it create a new page of material to be printed on the envelope form; and, if the address within the designated field includes a zip code, the system will add a corresponding barcode to the new page. The system then adds this new page to the file before the file is output.

U.S. Pat. No. 5,278,947 for a SYSTEM FOR AUTOMATIC PRINTING OF MAIL PIECES; issued Jan. 11, 1994 to Balga, Jr. et al. (hereinafter referred to as Balga), and assigned to the assignee of the present claimed invention, is for a system which includes a printer for printing text in response to the input of signals. The printer has a capability to selectively print either sheets or envelopes. The system further includes a controller for output of a sequence of signals representative of materials to be printed on a sheet which forms part of the mail piece, where the sequence includes a subset of signals representative of an address.

In accordance with another aspect of the Balga invention, the system includes a scanning mechanism for identifying a character string which conforms to a valid postal coding standard. The system further includes a mechanism for identifying the character string as a valid postal code. Additionally, the system forms the destination address to include a line including the postal code and a selected number of proceeding lines of text.

The ability to structure software coding is extremely important when linking data to be downloaded to a printer being utilized in the addressing environment. U.S. Pat. No. 5,583,970 for a PRINTER COMMAND SET FOR CONTROLLING ADDRESS AND POSTAL CODE PRINTING FUNCTIONS, issued Dec. 10, 1996 to Strobel (hereinafter referred to as Strobel), and assigned to the assignee of the present claimed invention, is instructive in this respect.

Strobel is a method and system for printing images to a substrate wherein the commands normally input by an operator, or resident within the printer, can be determined at a host data processor. The system can control address and postal code printing functions beginning at the host computer together. The system will derive printing data, including address data, from a selected application resident in the host computer. The host computer creates and then transmits printer command sets and printing data, via transmitting means to a microprocessor within the printer. The microprocessor drives a language interpreter which directs the printer commands to a parsing step for determining the address location from within the data to be printed. The language interpreter then assigns delivery point digits to a zip code that was isolated from the transmitted address data. The newly created zip code is then matched with the bar code data stored within the microprocessor's corresponding memory. A bar code corresponding to the new zip code is selected. The language interpreter then directs the printer's controller to prepare to print the address with its corresponding zip code, any graphics images that may have been included within the print data, and text, if any. The printer controller positions the bar code for printing, and then prints the bar code and address data, zip code, and any graphics images and text to an envelope or other substrate.

Thus, Strobel overcame the limitations of the prior art by providing flexibility in determining what data, and how much, may be downloaded for printing to a substrate. Flexibility is accomplished by controlling address and postal coding functions in the printer from a host computer. The invention thus simplifies the firmware required in a selected printer, or can allow the performance of additional tasks or provide for greater database functionality under the direction of the printer microprocessor. Thus, printer ROM memory can be reduced or freed up for other tasks, and RAM memory can be increased to handle more detailed data.

A particular limitation to current methods and systems, however, is found in the assembly of the address database which fuels the prior art detailed above. Mailpiece production systems and methods of perfecting database files must have raw material in the form of an address file. The current methods of identifying such raw material are limited to direct input by a system operator or by parsing of data in list formats.

Therefore, it is an object of the present invention to provide for a method and system for determining and extracting an address from a print stream.

SUMMARY OF THE INVENTION

The limitations of the prior art are overcome by a method and system for determining an address from a print stream in a data processing system.

The method of determination begins by initiating the print stream at a remote application. The remote location initiating the print stream typically comprises a microprocessor for manipulating data and a print stream application operatively connected to the microprocessor for creating the print stream. The print stream application can be a word processing application or similar type application that requires downloading to a printer. The remote location will also have transmission means for transmitting the print stream to the virtual driver.

The print stream is transmitted, from the remote location, through a Graphical Device Interface to a virtual driver where a system operator can select from at least two data interface modes. The selected data interface mode interfaces with an address parsing application which parses the print stream to identify address data resident in the print stream. The identified address data is then saved in a database for future use. The print stream is allowed to be printed or be displayed at a selected output device.

The data interface modes further comprise an eavesdrop mode and an intercept mode. The eavesdrop mode allows the virtual driver to pass the print stream through to the output device and wherein further the eavesdrop mode produces a duplicate copy of the print stream for transmission to a server. The server is linked to an address parsing module for parsing the print stream. The intercept mode, on the other hand, allows the virtual driver to pass the print stream directly to the server, wherein the server is linked to the address parsing module for parsing the print stream. The server can be an OLE automation server which in turn can pass the print stream to an output device such as a printer or monitor over transmission means.

The address parsing application further performs the steps of selecting the address parsing module which comprises parsing instructions. Parsing of the print stream to obtain address data is performed in accordance with those instructions. The address data is then placed into an address list or database.

The selection of the address parsing module further is based upon the address characteristics required by the system user. The user requirements are defined by creating an address data profile wherein the profile defines one or more tokens and wherein the tokens further define a characteristic of an address. The address data profile can be assigned to an addressing parsing module wherein the tokens comprising that address data profile are representative of a particular address format The address parsing module can then be selected as based upon its particular address format. The particular address format can be representative of a particular carrier, such as the United States Postal Service.

DETAILED DESCRIPTION OF THE PREFERRED EMBODIMENTS

Figure 1:
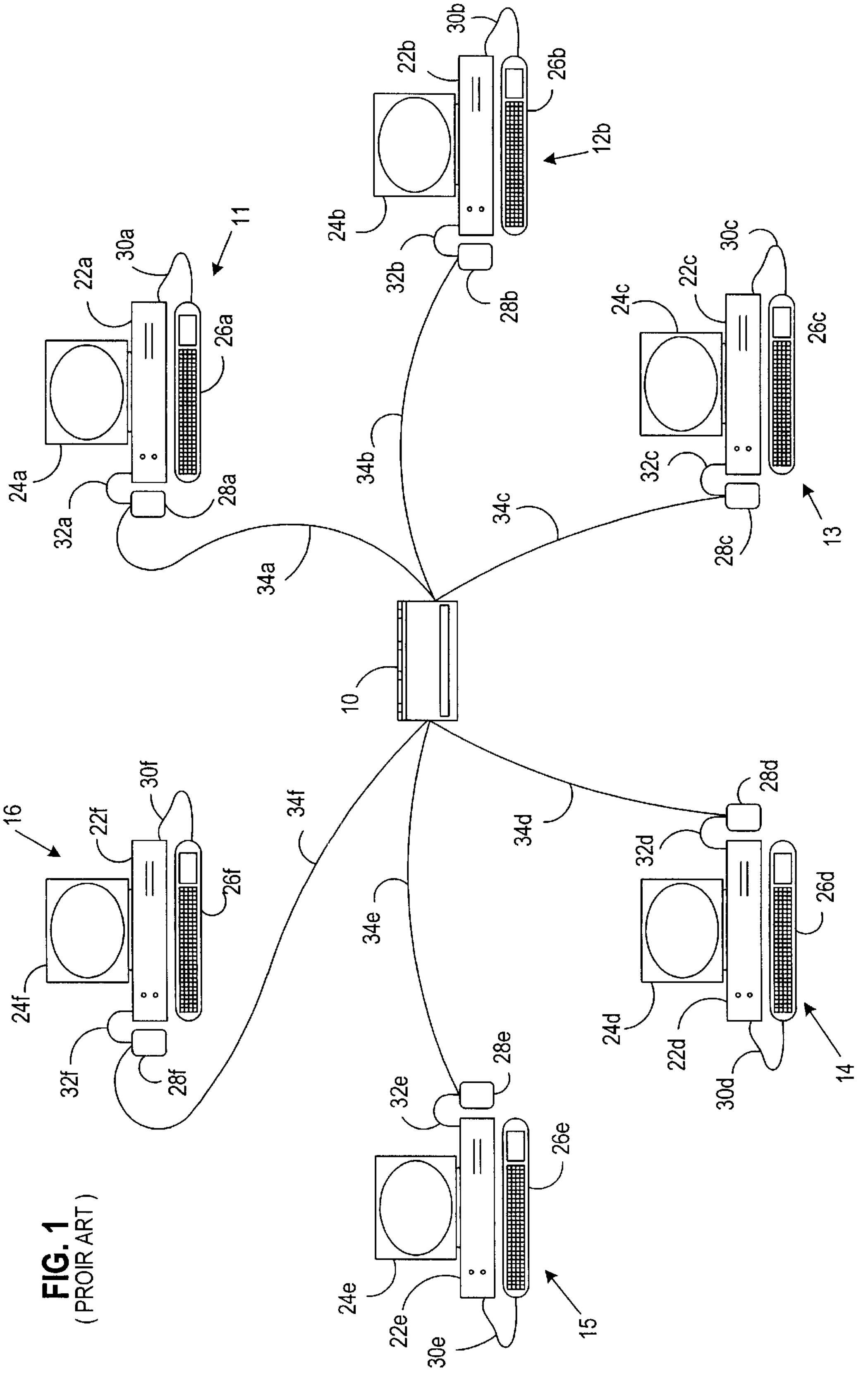
FIG. 1 is a diagram of a typical prior art networked system within which a print stream generated at a remote site is downloaded to a printer for output.

FIG. 1 depicts, in diagram form, a typical prior art networked printing environment.

The networked printer 10 receives a print stream from each of remote systems 11, 12, 13, 14, 15, and/or 16. The printer 10 can be any one of a number of commercially available printers that are capable of being networked with two or more remote locations.

A typical remote location, such as remote system 11, that can generate a print stream, has a central processing unit (CPU) 22*a* interoperatively connected to a monitor 24*a* CPU 22*a* processes data input from one or more data sources or input devices which can be interoperatively connected or interfaced as appropriate. Monitor 24*a* allows a system operator to view transactions occurring within the CPU 22*a*. CPU 22*a* is further connected to: a keyboard 26*a* for data input via interface cable 30*a;* a modem 28*a* for data transmission via interface cable 32*a;* and, to the network printer 10 for data output via interface cable 34*a*.

In FIG. 1, remote systems 12 through 16 are shown with elements common to remote system 11 but designated with the legends "b" though "f" respectively, the remote systems 12 through 16, each has a central processing unit (CPU) 22(*b–f* respectively) interoperatively connected to a monitor 24(*b–f* respectively). CPU 22(*b–f* respectively) is further connected to: a keyboard 26(*b–f* respectively) via interface cable 30(*b–f* respectively); a modem 28(*b–f* respectively) via interface cable 32(*b–f* respectively); the network printer 10 for data output via interface cable 34(*b–f* respectively).

Figure 2A:
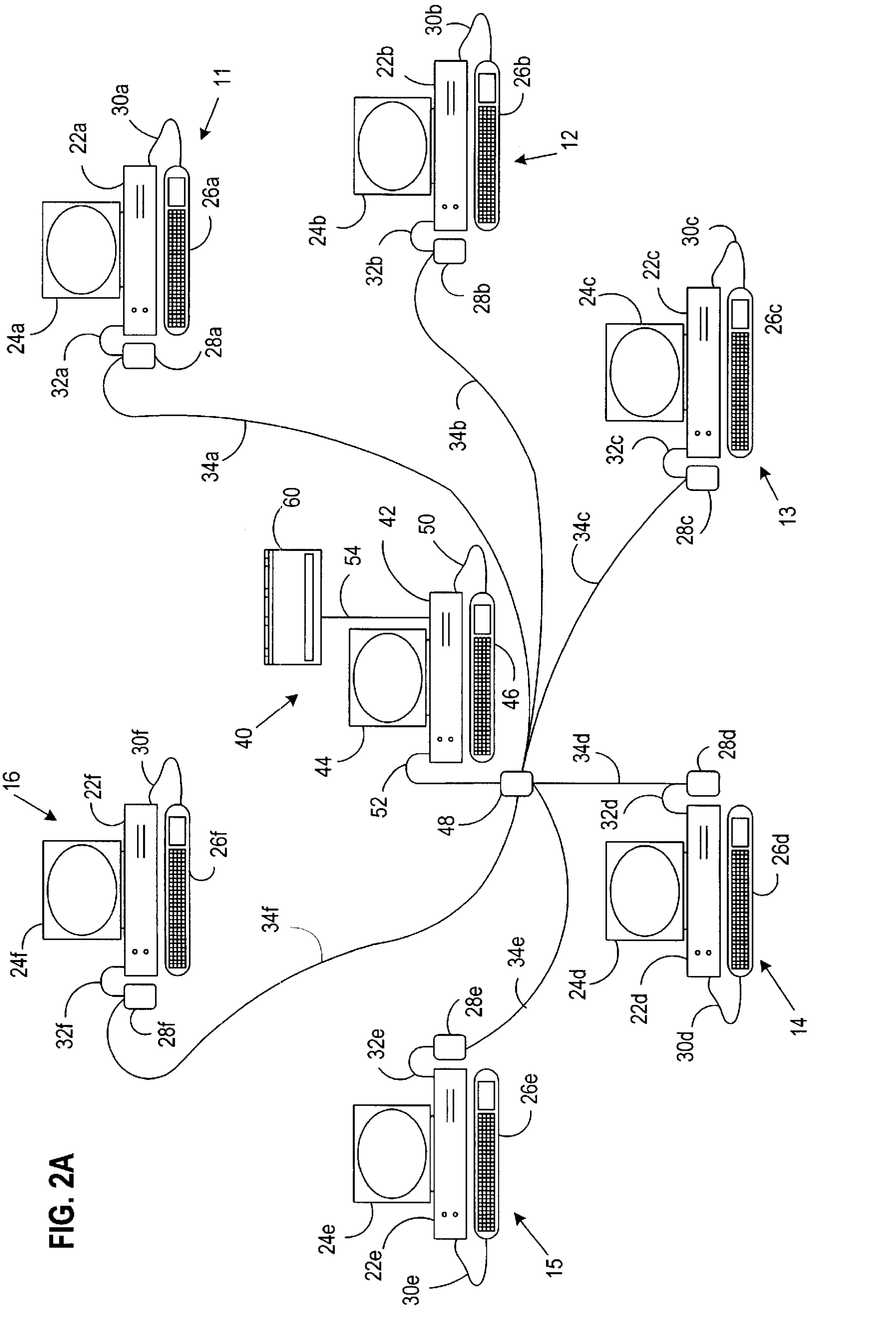
FIG. 2A is a diagram of a typical networked system within which the method of the present invention could reside.

Turning to FIG. 2A, there is shown the network environment in which the subject claimed invention can be utilized.

The host system 40 receives a print stream from each of remote systems 11, 12, 13, 14, 15, and/or 16. The host system 40, after intercepting the print stream then passes the print stream to the printer 60. The printer 60 can be any one of a number of commercially available printers that are capable of being networked with two or more remote locations.

A typical host system, such as host system 40, which intercepts a print stream, has a central processing unit (CPU) 42 interoperatively connected to a monitor 44.

CPU 42 processes the incoming print stream being received from interface cables 34(*a–f*) by passing the print stream through a Graphical Device Interface (GDI) to a virtual driver where a system operator can select from at least two data interface modes. The selected data interface mode interfaces with an address parsing application resident in CPU 42 which parses the print stream to identify address data resident in the print stream. The identified address data is then saved in a database located within CPU 42 for future use. Input devices can be interoperatively connected or interfaced to CPU 42 as appropriate. Monitor 44 allows a system operator to view transactions occurring within the CPU 42. CPU 42 is further connected to: a keyboard 46 for data input via interface cable 50; a modem 48 for data transmission or reception via interface cable 52; the network printer 60 for print stream data output via interface cable 54.

In FIG. 2A, remote systems 11 through 16 are shown with elements common to host system 40. The remote systems 11 through 16, each has a central processing unit (CPU) 22(*a–f* respectively) interoperatively connected to a monitor 24(*a–f* respectively). CPU 22(*a–f* respectively) is further connected to: a keyboard 26(*a–f* respectively) via interface cable 30(*a–f* respectively); a modem 28(*a–f* respectively) via interface cable 32(*a–f* respectively); and, to the host system 40 via interface cable 34(*a–f* respectively).

Figure 2B:
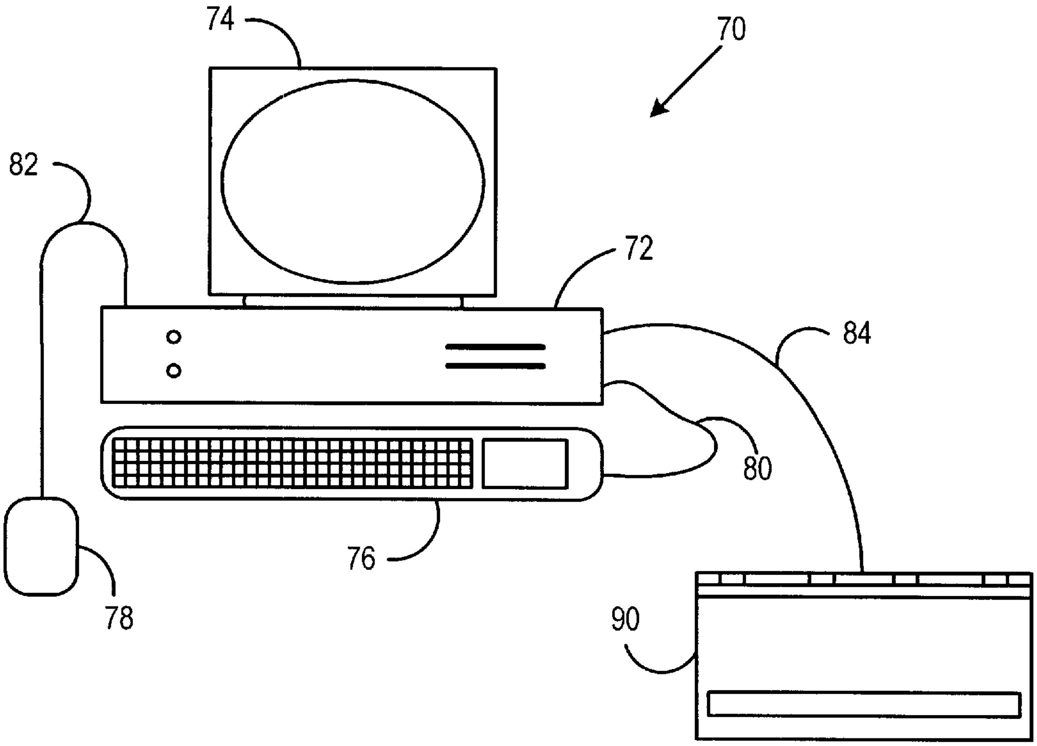
FIG. 2B is a diagram of a typical standalone system within which the method of the present invention could reside.

Turning to FIG. 2B, there is shown a stand-alone system environment in which the subject claimed invention can be utilized.

A typical stand-alone system, such as host system 70, which intercepts a print stream, has a central processing unit (CPU) 72 interoperatively connected to a monitor 74.

CPU 72 initiates the print stream in an appropriate application, then passes the print stream through a Graphical Device Interface to a virtual driver where a system operator can select from at least two data interface modes. The selected data interface mode interfaces with an address parsing application or data extraction module resident in CPU 72 which parses the print stream to identify address data resident in the print stream, or extracts data from the print stream based upon pre-determined extraction criteria. The identified address data or extracted data file is then saved in a database located within CPU 72 for future use. Input devices can be interoperatively connected or interfaced to CPU 72 as appropriate. Monitor 74 allows a system operator to view transactions occurring within the CPU 72. CPU 72 is further connected to: a keyboard 76 for data input via interface cable 80; a modem 78 for data transmission or reception via interface cable 82; and, a printer 90 for print stream data output via interface cable 84.

Figure 3A:
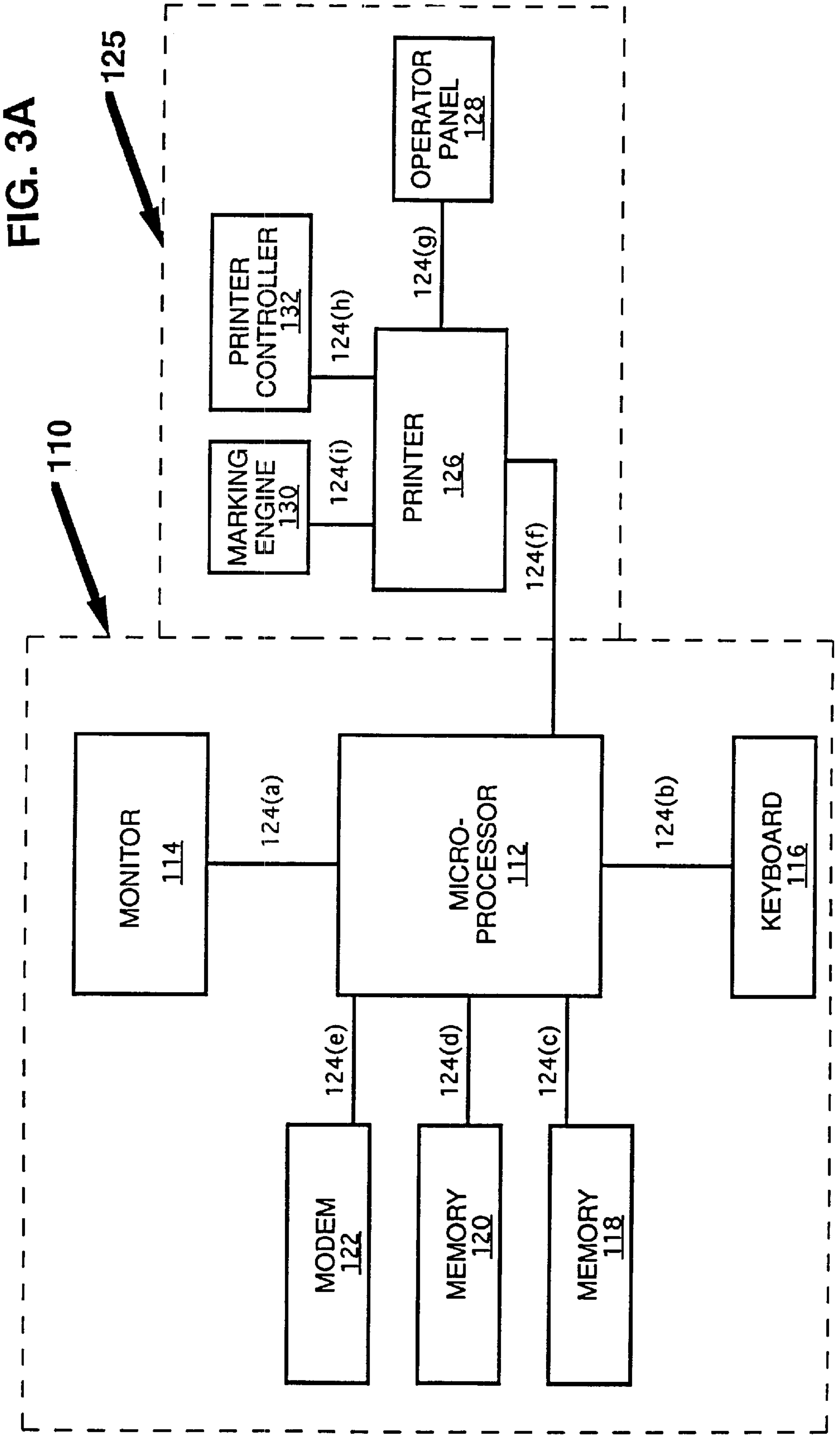
FIG. 3A is a block diagram of a typical host addressing system within which the virtual driver of the present invention could reside.

Turning to FIG. 3A, there are depicted in block form two subsets that, combined, form an addressing system. The addressing system can act as a host system such as that depicted in FIG. 2A, or can act as the initiating system for the print stream while supporting the virtual driver. Thus, the initiating application and the virtual driver applications are remote to each other though co-located within the same stand-alone data processing system.

Addressing subsystem 110 includes: microprocessor 112 connected to monitor 114 by interface cable 122*a;* keyboard 116 connected to microprocessor 112 by interface cable 122*b;* memory 118 operatively connected to microprocessor 112 at 122*c;* memory 120 operatively connected to microprocessor 112 at 122*d;* modem 122 connected to microprocessor 112 by interface cable 122*e;* and, interface cable 122*f* for connection to addressing subsystem 125.

Addressing subsystem 125 includes: printer 126 connected to addressing subsystem 110 by interface cable 122*f;* operator panel 128 operatively connected to printer 126 at 122*g;* printer controller 132 operatively connected to printer 126 at 122*h;* and, marking engine 130 operatively connected to printer 126 at 122I.

Figure 3B:
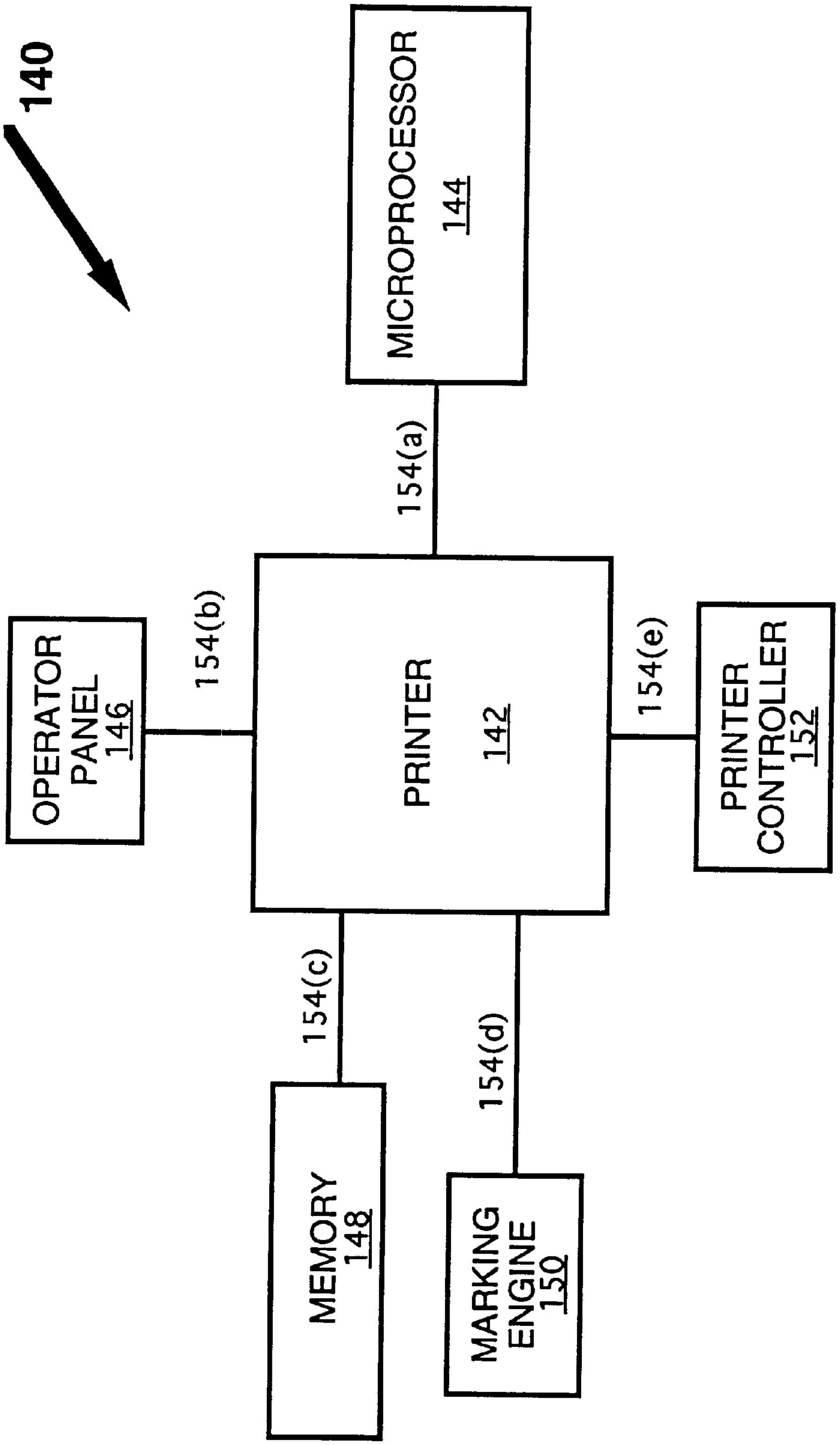
FIG. 3B is a block diagram of a typical addressing printer system within which the virtual driver of the present invention could reside.

A microcomputer, or any computer that can download data that can be printed on a printer whether that printer is a peripheral device of the computer or not, uses application programs for creating data. These are resident in the microcomputer ROM memory and in memory 118; memory 120 is utilized for the storing of address lists. The printers commonly utilized in the addressing art may also contain a microprocessor that is able to assign bar code data to addresses that are delivered from the host. These so-called "smart" printers vary in their ability to process data. FIG. 3B is a block diagram of a smart printer which can serve as an alternative host for the invention claimed herein.

Turning to FIG. 3B, system 140 is depicted as comprising: printer 142 which is operatively connected to microprocessor 144 at 154*a;* operator panel 146 operatively connected to printer 142 at 154*b;* memory 148 operatively connected to printer 142 at 154*c;* marking engine 150 operatively connected to printer 142 at 154*d;* and, printer controller 152 operatively connected to printer 142 at 154*e.*

Figure 4:
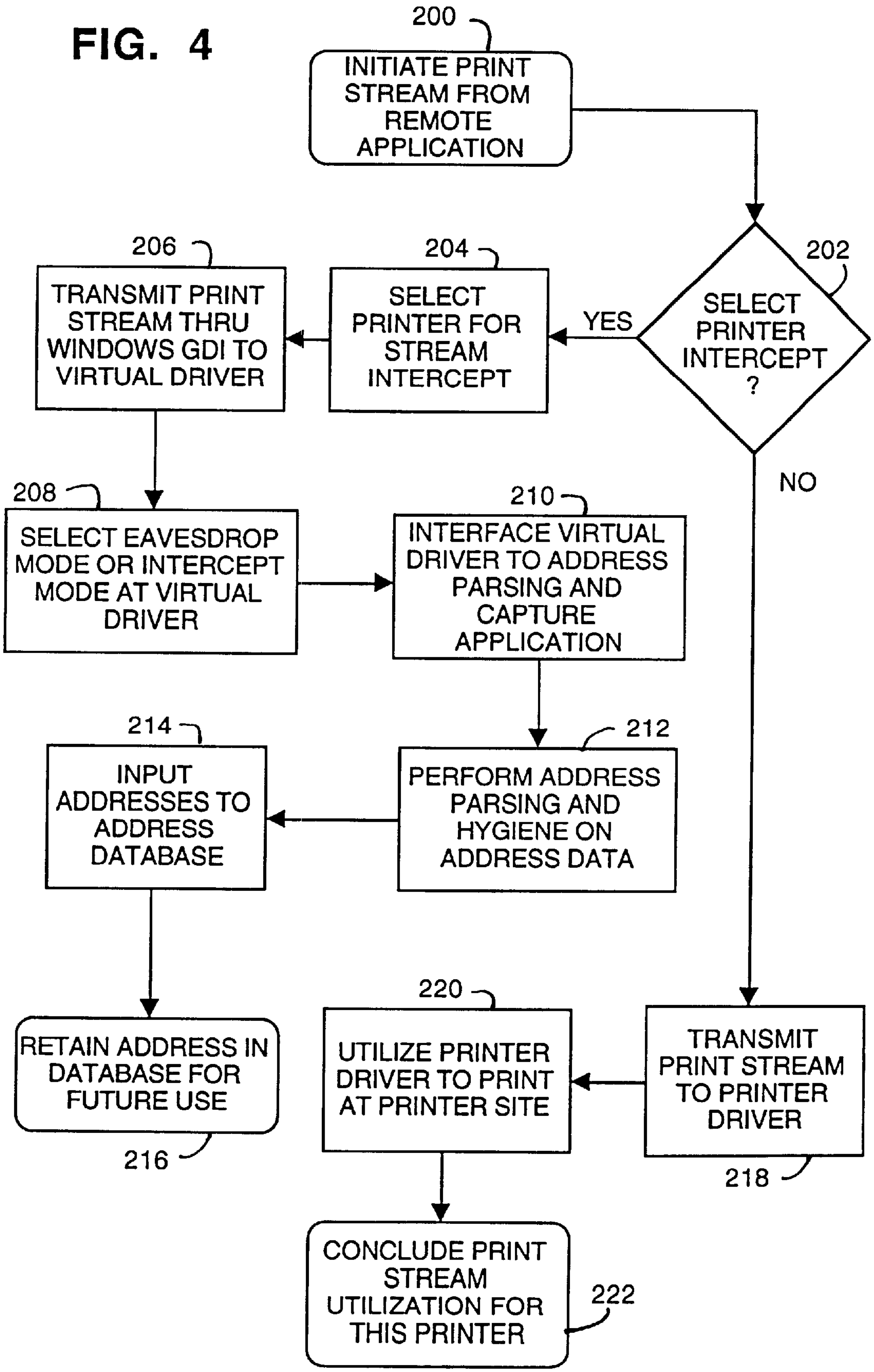
FIG. 4 is an upper level flowchart of the method of the present invention wherein an address is determined from a print stream and retained in a memory for future use.
Figure 5:
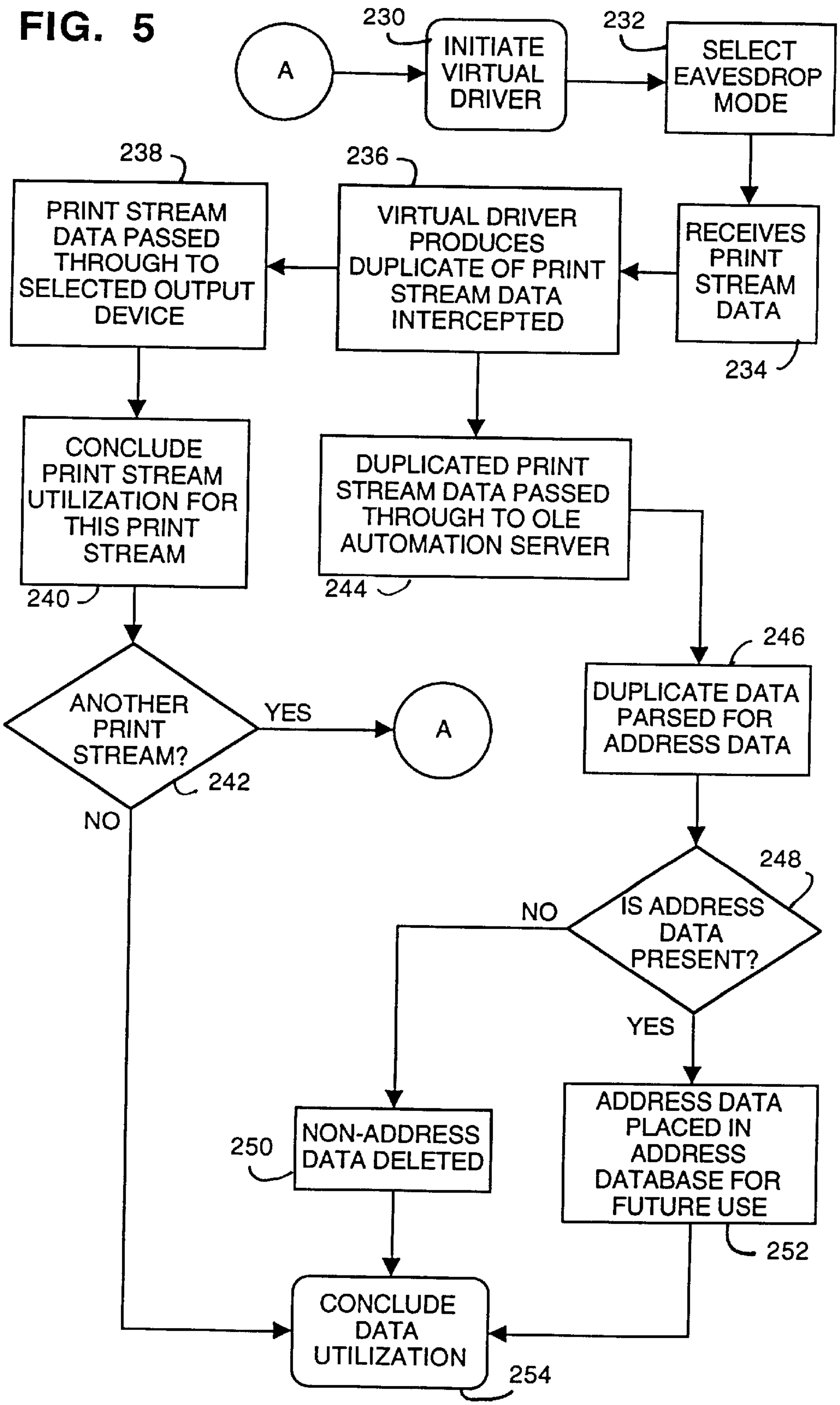
FIG. 5 is a detailed flowchart of the method of the present invention as it pertains to an eavesdrop option selected by a system operator.
Figure 6:
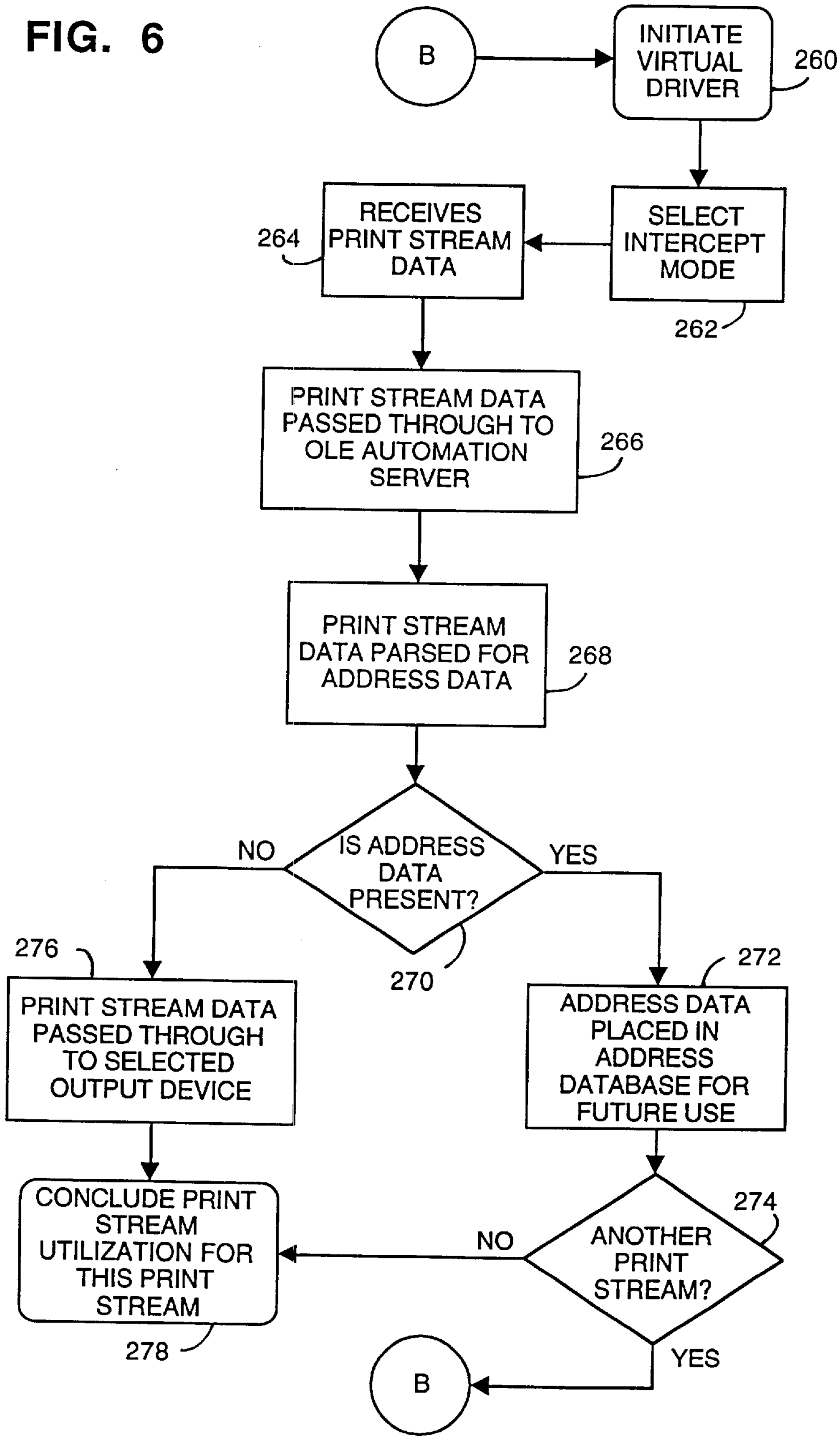
FIG. 6 is a detailed flowchart of the method of the present invention as it pertains to an intercept option selected by a system operator.

The system environment of the claimed invention hosts the method as is shown in FIGS. 4–6. Turning to FIG. 4, there is shown a flowchart of the method of the present invention wherein an address is determined from a print stream and retained in a memory for future use.

FIG. 4 begins at step 200 with the initiation of the print stream from a remote location such as that depicted in FIGS. 2A and 2B. The remote location can be located as remotely from the virtual driver as is possible with conventional transmission means, or may be co-located so that the remote location is only remote as to the separation of the virtual driver and the print stream generating application. From step 200 the method advances to a query at step 202.

The query at step 202 asks whether or not the host system 40 is to intercept a print stream generated at the remote location 11 (or 12, 13, . . . orn, as the case may be). If the response to the query is "NO," then the method advances to step 218 where the print stream is transmitted to the printer driver. From step 218, the method utilizes, at step 220, the printer driver to print the print stream at the selected printer site. It should be noted that the print stream environment can have more than one printer 60 available for outputting the print stream. In the case of multiple available printers, a particular printer is selected for downloading of the print stream. Upon printing the individual print stream at step 220, the print stream utilization for the printer is concluded, at step 222, until such time as a subsequent print stream is directed to the printer.

Returning to the query at step 202, if the response to the query is "YES," then the method advances to step 204 where a particular printer destination is selected for print stream interception. The method then advances to step 206 where the print stream is transmitted through a Windows$^R$ Graphical Device Interface (GDI) to a "virtual driver." The virtual driver can operate in one of two interface modes; these are the eavesdrop mode and the intercept mode.

The eavesdrop mode allows the virtual driver to pass the print stream through to the printer while producing a duplicate copy of the print stream for transmission to a server. The server is further linked to an address parsing module for parsing the print stream. The intercept mode, on the other hand, allows the virtual driver to pass the print stream directly to the server without making a duplicate copy; the server is further linked to the address parsing module for parsing the print stream. In a preferred embodiment, the server is an OLE automation server which in turn will pass the print stream to an output device such as a printer or monitor via an interface cable or similar link.

The method advances from step 206 to step 208 where either the eavesdrop or the intercept mode is selected by the system user. The modes could be predetermined as well by the system user. The system then proceeds to step 210 where the virtual driver is interfaced with an address parsing and capture application. The print stream, which was transmitted to the virtual driver at step 206, is then parsed at step 212, so that address data, if any is present in the print stream, in the form of an address file is extracted from the print stream. The extracted address file can then be subjected to an optional address hygiene routine. The routine can be utilized to perform address correction, assignment of zip codes, or checked against other address files for duplicate detection.

From step 212, the method advances to step 214 where the addresses are placed into an address database which can be further formatted in the form of an address list. The address is retained, at step 216, in the address database for future use which might include a print run to mailpieces for subsequent postal service delivery.

The method path for the eavesdrop and intercept modes is further detailed in FIGS. 5 and 6. Turning to FIG. 5, there is shown a detailed flowchart of the method as it pertains to an eavesdrop option selected by a system operator.

The flow begins at step 230 where the virtual driver is initiated before selection of the eavesdrop option is made at step 232. From step 232, the method advances to step 234 where the virtual driver receives the print stream data upon which it will act. The print stream data is duplicated by the virtual driver at step 236 before the original print stream is passed through to the selected output device or printer at step 238. The newly created duplicate print stream passes directly to step 244; its path will be further discussed hereinbelow. From step 238, the method then advances to step 240 where the utilization of the original print stream is concluded before advancing to a query at step 242.

At step 242, the system queries as to whether or not there is another print stream to be enacted upon. If the response to the query is "YES," then the method returns along path A to re-enter the flow at step 230. However, if the response to the query at step 242 is "NO," then the method advances to step 254 and concludes data utilization for the original print stream.

Returning to step 244, the duplicate print stream is passed by the virtual driver to an OLE automation server or similar server capable of linking with an appropriate parsing application. The automation server application is responsible for the parsing of print stream data, extraction of address information, and compilation of an address list. By interfacing with an interchangeable parsing module, the automation server is able to extract addresses of varied format. Additionally, the automation server can be configured to save additional information about the print job (i.e., number of pages, username, etc.) with each address in the database. The address parsing application performs the steps of selecting the address parsing module which comprises particular parsing instructions. Parsing of the print stream to obtain address data is performed in accordance with those instructions. The address data is then placed into an address list or database.

The selection of the address parsing module further is based upon the address characteristics required by the system user. The user requirements are defined by creating an address data profile wherein the profile defines one or more tokens and wherein the tokens further define a characteristic of an address. The address data profile can be assigned to an addressing parsing module wherein the tokens comprising that address data profile are representative of a particular address format The address parsing module can then be selected as based upon its particular address format. The particular address format can be representative of a particular carrier, such as that of the United States Postal Service, Federal Express, or similar carrier that has particular address file requirements.

The method then advances from step 244 to step 246 where the duplicate print stream is parsed for address data. The method will query at step 248 as to whether or not any address data is located during the parsing process. If the response to the query is "YES," then the method advances to step 252 where the extracted address data is placed in an address database for future use or possible address hygiene. The general uses would include the creation of address lists for mailing or shipping. Once the address data has been saved in the form of a file within a database, the method advances to step 254 where the data utilization of the duplicate print stream is concluded. Returning to step 248, if the response to the query is "NO," however, then the method advances to step 250 where the non-address data is deleted before advancing to step 254.

Turning to FIG. 6, there is shown a detailed flowchart of the method as it pertains to an intercept option selected by a system operator.

The flow begins at step 260 where the virtual driver is initiated before selection of the intercept option is made at step 262. From step 262, the method advances to step 264 where the virtual driver receives the print stream data upon which it will act. The method then advances to step 266 where the duplicate print stream is passed by the virtual driver to an OLE automation server or similar server capable of linking with an appropriate parsing application. The automation server application is responsible for the parsing of print stream data, extraction of address information, and compilation of an address list. By interfacing with an interchangeable parsing module, the automation server is able to extract addresses of varied format. Additionally, the automation server can be configured to save additional information about the print job (i.e., number of pages, username, etc.) with each address in the database. The address parsing application performs the steps of selecting the address parsing module which comprises particular parsing instructions. Parsing of the print stream to obtain address data is performed in accordance with those instructions. The address data is then placed into an address list or database.

The selection of the address parsing module further is based upon the address characteristics required by the system user. The user requirements are defined by creating an address data profile wherein the profile defines one or more tokens and wherein the tokens further define a characteristic of an address. The address data profile can be assigned to an addressing parsing module wherein the tokens comprising that address data profile are representative of a particular address format. The address parsing module can then be selected as based upon its particular address format. The particular address format can be representative of a particular carrier, such as that of the United States Postal Service, Federal Express, or similar carrier that has particular address file requirements.

The method then advances from step 266 to step 268 where the duplicate print stream is parsed for address data. The method will query at step 270 as to whether or not any address data is located during the parsing process. If the response to the query is "YES," then the method advances to step 272 where the extracted address data is placed in an address database for future use or possible address hygiene. The general uses would include the creation of address lists for mailing or shipping.

Once the address data has been saved in the form of a file within a database, the method advances to step 274 where the system queries as to whether or not there is another print stream to be enacted upon. If the response to the query is "YES," then the method returns along path B to re-enter the flow at step 260. However, if the response to the query at step 274 is "NO," then the method advances to step 278 and concludes data utilization for the print stream.

Returning to step 270, if the response to the query is "NO," however, then the method advances to step 276 where the print stream data is passed through to the selected output device before advancing to step 278.

Figure 7:
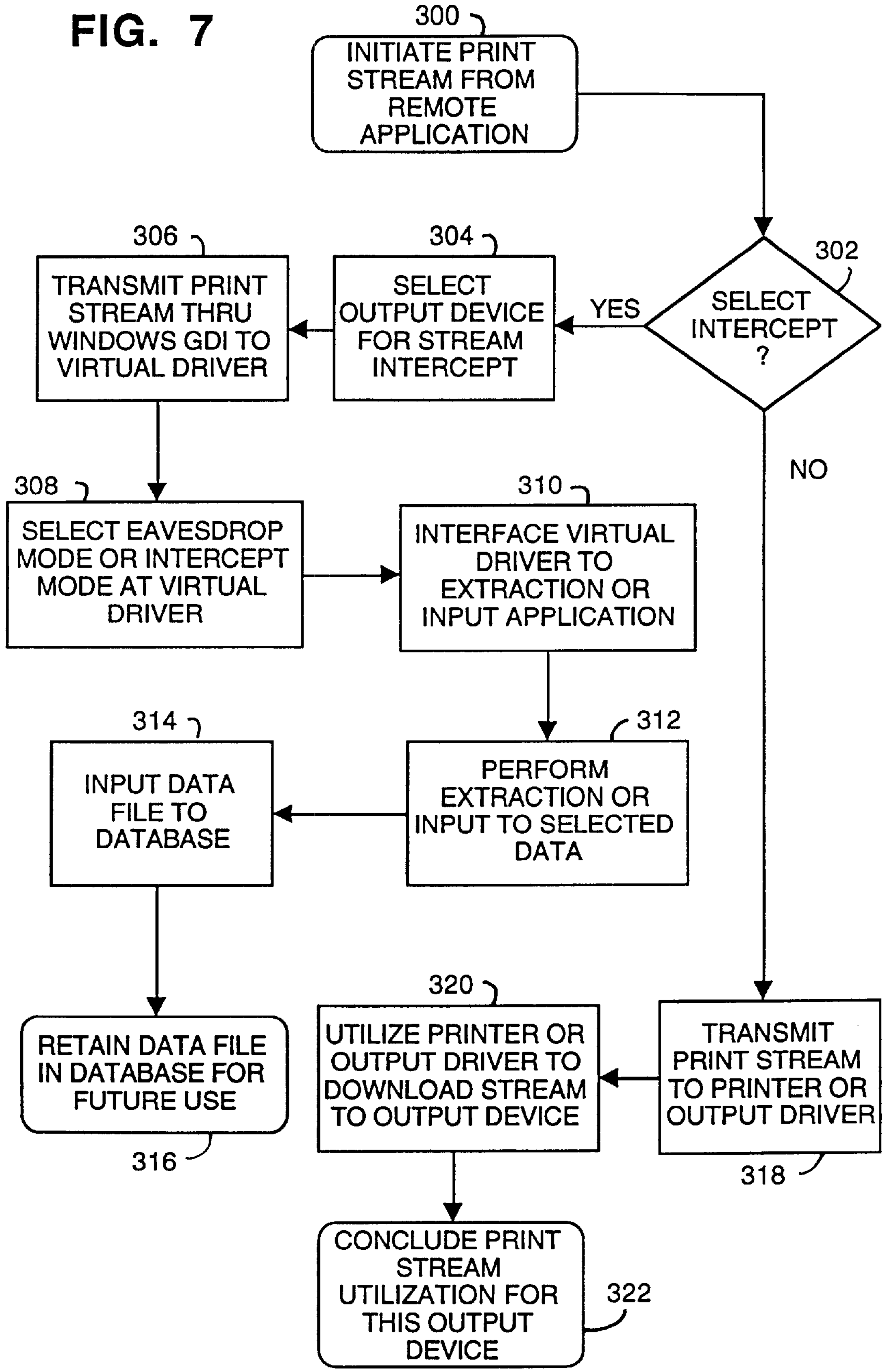
FIG. 7 is a detailed flowchart of an alternative embodiment of the present invention wherein an extraction or an input module is selected for interface with the print system.

Turning to FIG. 7, there is shown a detailed flowchart of an alternative embodiment of the present invention wherein an extraction or an input module is selected for interface with the print stream. This differs from the embodiment of FIG. 4 where the virtual driver interfaced with an address parsing module; in this embodiment, the system can extract or input data from/to the print stream for further use.

The flow begins at step 300 with the initiation of the print stream from a remote application. The remote application can be located as remotely from the virtual driver as is possible with conventional transmission means, or may be colocated so that the remote application is only remote as to the separation of the virtual driver and the print stream generating application. From step 300, the method advances to a query at step 302.

The query at step 302 asks whether or not the host system is to intercept a print stream generated at the remote application. If the response to the query is "NO," then the method advances to step 318 where the print stream is transmitted to the output device driver. From step 318, the method utilizes, at step 320, the output driver to download the print stream at the selected output site. It should be noted that the print stream environment can have more than one output device available for outputting the print stream. In the case of multiple available printers, for instance, a particular printer is selected for downloading of the print stream. Upon outputting the individual print stream at step 320, the print stream utilization for the output device is concluded, at step 322, until such time as a subsequent print stream is directed to the output device.

Returning to the query at step 302, if the response to the query is "YES," then the method advances to step 304 where a particular output destination is selected for print stream interception. The method then advances to step 306 where the print stream is transmitted through a Graphical Device Interface (GDI) to a "virtual driver." The virtual driver can operate in one of two interface modes; these are the eavesdrop mode and the intercept mode.

The eavesdrop mode allows the virtual driver to pass the print stream through to the printer while producing a duplicate copy of the print stream for transmission to a server. The server is further linked to either an extraction module or an input module. The intercept mode, on the other hand, allows the virtual driver to pass the print stream directly to the server without making a duplicate copy; the server is further linked to either the extraction or input modules for interfacing with the print stream. In a preferred embodiment, the server is an OLE automation server which in turn will pass the print stream to an output device such as a printer or monitor via an interface cable or similar link.

The extraction module is similar to the parsing module in that it will interface with the print stream to extract data from the stream. However, the extraction module can be used to select specifically defined data fields, such as: name; date; or subject fields. The module is defined by the instructions it contains with respect to the data it extracts from the print stream. Instructions are further defined by tokens which, when taken together, instruct the virtual river on the data sought to be extracted.

The input module differs the parsing module in that it will interface with the print stream to input data to the stream. Like the extraction module, the input module can be used to input specifically defined data fields, such as character codes or instructions for subsequent use. The module is defined by the instructions it contains with respect to the data it inputs to the print stream. Instructions are further defined by tokens which, when taken together, instruct the virtual driver on the data sought to be input at a particular location within the stream.

The method advances from step 306 to step 308 where either the eavesdrop or the intercept mode is selected by the system user. The modes can be pre-determined as well by the system user. The system then proceeds to step 310 where the virtual driver is interfaced with the extraction or input modules. The print stream, which was transmitted to the virtual driver at step 306, is then acted upon by the module at step 312, so that specific data, in the form of an data file is either extracted or input.

From step 312, the method advances to step 314 where the extracted data or an input record is placed into a database. The data file is retained, at step 316, in the database for future use.

While certain embodiments have been described above in terms of the system within which the address object methods may reside, the invention is not limited to such a context. The system shown in FIGS. 2A, 2B, 3A, and 3B are examples of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of extracting an address data from a print stream in a data processing system, comprising the steps of:

(a) initiating said print stream at a remote application;

(b) transmitting said print stream through a graphical device interface to a virtual driver;

(c) selecting either an eavesdrop mode or an intercept mode from a plurality of data interface modes at said virtual driver wherein said selected data interface mode interfaces with an address parsing application;

wherein said eavesdrop mode allowing said virtual driver to pass said print stream through to said output device and producing a duplicate copy of said print stream transmitted to a server wherein steps of parsing said print stream by said address parsing application is carried out on the duplicate copy of said print stream; and said intercept mode allowing said virtual driver to pass said print stream directly to said server wherein said the steps of parsing said print stream is carried out at said the server;

(d) parsing said print stream at said address parsing application, wherein said address parsing application further performs the steps of:

i. selecting an address parsing module wherein said address parsing module comprises parsing instructions;

ii. parsing said print stream to identify address data resident in said print stream in accordance with said parsing instructions; and iii. compiling an address list comprising said address data;

(e) retaining said identified address data in a database for future use; and (f) printing said print stream at a selected output device.

2. The method of claim 1, wherein said step of initiating said print stream further comprises:

creating a print stream with print stream application.

3. The method of claim 1, wherein said step of selecting said address parsing module further comprises the steps of:

(a) creating an address data profile wherein the address data profile defines one or more tokens and wherein the tokens define a characteristic of an address;

(b) assigning said address data profile to said addressing parsing module wherein said tokens comprising said address data profile are representative of a particular address format; and (c) selecting said address parsing module based upon its particular address format.

4. The method of claim 3, wherein said particular address format is representative of a particular carrier.

5. The method of claim 1, wherein the step of parsing said print stream further comprises the step of using an OLE Automation server as the server for the step of parsing.

6. The method of claim 1, further comprising the step of using a printer as the selected output device.

7. A system of extracting an address data from a print stream, comprising:

(a) a data processing station being capable of initiating said print stream;

(b) transmitting means for transmitting said print stream through a graphical device interface to a virtual driver:

(c) selecting means for selecting either an eavesdrop mode or an intercept mode from a plurality of data interface modes at said virtual driver wherein said selected data interface mode interfaces with an address parsing application;

wherein said eavesdrop mode allows said virtual driver to pass said print stream through to said output device and produces a duplicate copy of said print stream transmitted to a server wherein said address parsing application parsing said print stream is carried out on the duplicate copy of said print stream; and said intercept mode allows said virtual driver to pass said print stream directly to said server wherein said address parsing application parsing said print stream is carried out at said server;

(d) said address parsing application further comprising:

i. means for selecting an address parsing module wherein said address parsing module comprises parsing instructions;

ii. address parsing means for parsing said print stream to identify address data resident in said print stream in accordance with said parsing instructions; and iii. means for compiling an address list comprising said address data;

(e) means for retaining said identified address data in a database for future use; and (f) means for printing said print stream at a selected output device.

8. The system of claim 7, wherein said output device is a printer for printing said print stream to a substrate.

9. The system of claim 7, wherein said server is an OLE Automation server.

10. A method of extracting data from a print stream in a data processing system, comprising the steps of:

(a) initiating said print stream at a remote application;

(b) transmitting said print stream through a Graphical Device Interface to a virtual driver;

(c) selecting one of a plurality of data interface modes at said virtual driver wherein said selected data interface mode interfaces with a data marker application; said data marker application further performing the steps of:

(i) selecting either an extraction module or an input module based upon a system operator determination;

(ii) performing a routine in accordance with a set of instructions contained in said extraction module or said input module; and (iii) selecting either an eavesdrop mode or an intercept mode, wherein said eavesdrop mode allows said virtual driver to pass said print stream through to said output device and produces a duplicate copy of said print stream transmitted to a server and extracting selected data by said data marker application from duplicate print stream at said server; and said intercept mode allows the virtual driver to pass said print stream directly to said server and extracting selected data by said data marker application from said print stream at said server; and (d) printing said print stream at a selected output device.

11. The method of claim 10, further comprising the steps of: defining said extraction module with data capture instructions; and defining a profile of a data file with said data capture instructions and with one or more tokens wherein said tokens, wherein said tokens define a characteristic of said data file.

12. The method of claim 11, comprising the further steps of:

(a) assigning said data profile to said extraction module wherein said tokens comprising said data profile are representative of a particular data requirement; and (b) selecting said extraction module based upon its particular data requirement.

13. The method of claim 10, further comprising the steps of: defining said input module with data entry instructions; and defining a profile of a data file with said data input instructions and with one or more tokens, wherein said tokens define a characteristic of said data file.

14. The method of claim 13, comprising the further steps of:

(a) assigning said data profile to said input module wherein said tokens comprising said data profile are representative of a particular data requirement; and (b) selecting said input module based upon its particular data requirement.

15. The method of claim 10, wherein said step of printing said print stream further comprises using a printer for printing said print stream to a substrate.

* * * * *